United States Patent
Jeltsch et al.

(10) Patent No.: US 10,005,268 B2
(45) Date of Patent: Jun. 26, 2018

(54) METHOD FOR THE CONTINUOUS PRODUCTION OF LAMINATES MADE OF FIBRE BANDS AND USE THEREOF

(71) Applicant: EMS-PATENT AG, Domat/Ems (CH)

(72) Inventors: Thomas Jeltsch, Domat/Ems (CH); Bernd Henkelmann, Bonaduz (CH); Marcus Arnold, Unterägeri (CH); Markus Henne, Schaffhausen (CH)

(73) Assignee: EMS-PATENT AG, Domat/Ems (CH)

( * ) Notice: Subject to any disclaimer, the term of this patent is extended or adjusted under 35 U.S.C. 154(b) by 112 days.

(21) Appl. No.: 14/204,404

(22) Filed: Mar. 11, 2014

(65) Prior Publication Data
US 2014/0272227 A1 Sep. 18, 2014

(30) Foreign Application Priority Data
Mar. 12, 2013 (EP) .................................... 13158777

(51) Int. Cl.
| | |
|---|---|
| B32B 37/20 | (2006.01) |
| B29C 70/50 | (2006.01) |
| B29C 70/20 | (2006.01) |
| B32B 5/26 | (2006.01) |
| F16F 1/368 | (2006.01) |

(Continued)

(52) U.S. Cl.
CPC ............ *B32B 37/203* (2013.01); *B29C 70/20* (2013.01); *B29C 70/504* (2013.01); *B32B 5/26* (2013.01); *B32B 38/1866* (2013.01); *F16F 1/368* (2013.01); *B29C 53/265* (2013.01); *B32B 38/06* (2013.01); *B32B 2305/076* (2013.01); *Y10T 156/10* (2015.01); *Y10T 156/1007* (2015.01); *Y10T 428/1372* (2015.01); *Y10T 428/24995* (2015.04)

(58) Field of Classification Search
CPC ....................................... B29C 65/48
USPC ..................... 156/166–181, 309.6, 324, 199; 428/298.1, 299.1, 299.4, 299.7
See application file for complete search history.

(56) References Cited

U.S. PATENT DOCUMENTS

| | | | | |
|---|---|---|---|---|
| 3,616,123 | A | * | 10/1971 | Reynolds, Jr. .......... B29C 53/12 138/129 |
| 4,543,145 | A | | 9/1985 | Schnell et al. |

(Continued)

FOREIGN PATENT DOCUMENTS

| | | |
|---|---|---|
| CN | 1164201 A | 11/1997 |
| CN | 1402678 A | 3/2003 |

(Continued)

OTHER PUBLICATIONS

Intellectual Property Office of Singapore, Invitation to Respond to Written Opinion in Singapore Patent Application No. 10201400389W (dated Apr. 12, 2016).

(Continued)

*Primary Examiner* — Scott W Dodds
(74) *Attorney, Agent, or Firm* — Leydig, Voit & Mayer, Ltd.

(57) ABSTRACT

The invention relates to a method for the continuous production of laminates made of at least two fiber bands made of fibers which are embedded unidirectionally in a plastic material matrix. Likewise, the invention relates to laminates which are produced in this way and can have a shape memory. The laminates according to the invention are used for local reinforcement of injection molded parts.

13 Claims, 3 Drawing Sheets

(51) Int. Cl.
  *B32B 38/18* (2006.01)
  *B29C 53/26* (2006.01)
  *B32B 38/06* (2006.01)

(56) References Cited

U.S. PATENT DOCUMENTS

| | | | | |
|---|---|---|---|---|
| 4,680,224 | A * | 7/1987 | O'Connor | B29C 70/521 |
| | | | | 427/430.1 |
| 4,997,503 | A * | 3/1991 | Bohannan | B29C 53/581 |
| | | | | 156/173 |
| 5,019,450 | A * | 5/1991 | Cogswell | B29B 9/14 |
| | | | | 428/402 |
| 6,500,370 | B1 * | 12/2002 | Belvin | B29C 70/16 |
| | | | | 156/180 |
| 6,821,613 | B1 | 11/2004 | Kägi et al. | |
| 6,841,114 | B2 | 1/2005 | Fujiwara et al. | |
| 7,674,495 | B2 | 3/2010 | Pardo et al. | |
| 7,905,975 | B2 * | 3/2011 | Suzuki | B29C 70/50 |
| | | | | 156/180 |
| 8,357,457 | B2 | 1/2013 | Green et al. | |
| 2002/0190430 | A1 | 12/2002 | Fujiwara et al. | |
| 2003/0094232 | A1 * | 5/2003 | Saitou | C08J 5/24 |
| | | | | 156/181 |
| 2006/0051540 | A1 | 3/2006 | Kagawa | |
| 2008/0111275 | A1 | 5/2008 | Kline et al. | |
| 2008/0251620 | A1 * | 10/2008 | Neubert | B29C 53/66 |
| | | | | 242/125 |
| 2010/0024966 | A1 | 2/2010 | Felip | |

FOREIGN PATENT DOCUMENTS

| | | |
|---|---|---|
| CN | 1556746 A | 12/2004 |
| DE | 4325260 A1 | 2/1995 |
| DE | 102 13 798 A1 | 10/2001 |
| DE | 10 2007 037680 A1 | 2/2009 |
| DE | 102008026161 A1 | 12/2009 |
| DE | 10 2011 077834 A1 | 12/2012 |
| DE | 10 2011 120986 A1 | 6/2013 |
| EP | 0 313 171 A1 | 4/1989 |
| EP | 0579047 A1 | 1/1994 |
| EP | 1 577 073 A1 | 9/2005 |
| GB | 2 384 461 A | 7/2003 |
| JP | H02-160512 A | 6/1990 |
| JP | H03-253308 A | 11/1991 |
| JP | H04-345813 A | 12/1992 |
| JP | H08-252837 A | 10/1996 |
| JP | H11-19972 A | 1/1999 |
| JP | 2005-514243 A | 5/2005 |
| JP | 2009-274388 A | 11/2009 |
| JP | 2010-509095 A | 3/2010 |
| JP | 2010-234744 A | 10/2010 |
| WO | WO 99/52703 A1 | 10/1999 |
| WO | WO 2003/059600 A1 | 7/2003 |

OTHER PUBLICATIONS

State Intellectual Property Office of People's Republic of China, First Office Action in Chinese Patent Application No. 201410088562.6 (dated Aug. 25, 2016).

Intellectual Property Office of Singapore, Written Opinion in Singapore Application No. 10201400389W (dated Jan. 25, 2017).

Intellectual Property Office of Taiwan, Notice of Examination in Taiwanese Application No. 103107369 (dated Apr. 13, 2017).

State Intellectual Property Office of People's Republic of China, Office Action in Chinese Application No. 201410088562.6 (dated Apr. 26, 2017).

Japan Patent Office, Notification of Reasons for Refusal in Japanese Patent Application No. 2014-048393 (dated Jan. 31, 2018).

State Intellectual Property Office of People's Republic of China, Third Office Action in Chinese Application No. 201410088562.6 (dated Nov. 9, 2017).

* cited by examiner

METHOD FOR THE CONTINUOUS PRODUCTION OF LAMINATES MADE OF FIBRE BANDS AND USE THEREOF

CROSS-REFERENCE TO A RELATED APPLICATION

This application claims the benefit of European Patent Application No. 13 158 777.6, filed Mar. 12, 2013, the disclosure of which is incorporated herein by reference.

The invention relates to a method for the continuous production of laminates made of at least two fibre bands made of fibres which are embedded unidirectionally in a plastic material matrix. Likewise, the invention relates to laminates which are produced in this way and can have a shape memory. The laminates according to the invention are used for local reinforcement of injection moulded parts.

In lightweight construction, in particular in automobile construction, increasingly fibre-reinforced composite components are used for bearing construction components. For weight- and cost-optimised lightweight construction with fibre composite components, the use of cost-determining materials, in particular fibre components, must be minimised. It has been proposed to date that the fibres are integrated correctly with respect to force flow in the component structure without fibre cutting occurring. This is made possible by various textile techniques, such as for example braiding, weaving, sewing etc., which are used for the production of fibre preforms (so-called preforms) for endless fibre-reinforced composite components. These methods enable the transfer of force flow- and stress analyses into a corresponding textile reinforcing structure. When using an embroidery or sewing technique, the reinforcing fibres are fixed with an automatic embroidery machine corresponding to the requirements from the analytical component calculation on an embroidery basis. However, it is disadvantageous with this method that, after production of the preform, the corresponding fibre structure must be impregnated with resin or plastic material. Consequently, an additional method step which significantly increases the cycle times of the manufacturing process results.

When using duroplastic materials for the production of the matrix of the fibre composite component, so-called infusion methods, such as for example RTM (resin transfer moulding), SRIM (structural resin injection moulding) or vacuum injection are available for this subsequent impregnation of the fibre structure, the plastic material matrix being injected into a corresponding mould cavity of the fibre composite component by means of pressure impingement, and curing under heat and pressure. The injection methods are however relatively complex and allow only low productivity because of relatively long production cycles.

A method for the production of structural components is known from WO 99/52703, in which molten endless fibre strands are placed one above the other so that they form a coherent carrier structure with planar connecting parts and are compressed in a tool with a shape-forming long-fibre-reinforced material. Even these known methods still have substantial disadvantages with respect to the complexity of production, reproducibility and the defined formation of integrated endless fibre carrier structures. Thus, it is not possible for example to produce a defined one-part structural component which can be produced in one compression step and which comprises an integrated, precisely defined endless fibre reinforcing structure which is optimised with respect to position.

In DE 10 2008 026 161 A1, a method for the production of fibre composite components is described, in which a matrix material is applied on the reinforcing fibres, the reinforcing fibres and the matrix material are combined with formation of an impregnated fibre material and subsequently are applied on a carrier structure which imitates the shape of the fibre composite part. A disadvantage with this method is that no freely shapeable fibre bands are provided, but rather these are always joined to a carrier structure.

Furthermore, so-called prepregs are known, with which normally an endless fibre-reinforced semifinished product, e.g. in the form of fibre bands, is characterised. It is disadvantageous with these pre-impregnated fibres however that the resulting semifinished product can be used only for geometrically simple structures because of its nature and in addition causes very high consumption of fibre material since cutting the prepregs to the desired contour or shape of the fibre composite part must always take place. Consequently, corresponding fibre waste occurs which makes the production of fibre composite components when using prepregs significantly more expensive.

Because of the non-thermoplastic properties of endless fibres made of the materials carbon, glass, aramide or the like, the preshaping of these prepregs in the form of endless fibre bands for the purpose of positioning and spraying-over, in particular in an injection moulding tool, represents a problem.

Starting herefrom, it was the object of the present invention to provide a method for the production of laminates which enables as great a flexibility as possible with respect to the shape of the laminates and, at the same time, enables as high a productivity as possible in the production of such laminates.

This object is achieved by the method for the continuous production of laminates, by the features of the laminates thereof and the advantageous developments described therein. Uses according to the invention are also described.

According to the invention, a method for the continuous production of laminates made of at least two fibre bands made of fibres embedded unidirectionally in a plastic material matrix is provided, which has the following steps:
 a) transport of the fibre bands from respectively one material store with at least one transport roller to a joining station,
 b) layer-like combining of the fibres bands at the joining station by at least two consolidation units,
 c) joining the fibre bands by means of the two consolidation units to form a continuous laminate and also
 d) solidification of the laminate.

All joining methods known from the state of the art, such as shaping, welding, soldering, gluing, plasma joining, clamping, sewing and solvent joining can be used as joining techniques. For particular preference, the plastic material matrix of the fibre bands is melted, compressed in the molten state and subsequently solidified by cooling.

The consolidation units can be for example consolidation rollers, conveyer chains or conveyer belts, consolidation rollers should be used for preference.

A further preferred embodiment provides that, before or during step d), shaping of the laminate is effected by means of at least two shaping units, in particular shaping rollers, the shaping units being positioned behind the consolidation units such that different shapes of the laminate are produced during solidification of the laminate due to the stressing of the laminate.

The shaping can thereby be effected not only by rigid arrangement of the shaping units. It is also likewise possible that shaping is possible by means of rotary and translatory displacement of the shaping units during the lamination process. Then also more complex geometries, such as S-shaped or meandering geometries can herewith be produced. Furthermore, it is preferred that the rotary and translatory movement of the shaping units is fixed via a process control unit.

Furthermore, it is preferred that the fibre bands are prepared for the joining process in a pretreatment station which is disposed between the transport rollers and the joining station. Basically all pretreatment steps, such as for example heating, applying adhesive, degreasing, flame treatment, plasma treatment and drying of the fibre bands, are included herein.

For the variant according to the invention of solidification of the molten fibre bands, a thermal treatment of the fibre bands is effected in the pretreatment station, melting of the plastic material matrix, at least in regions, being effected. Subsequently, the fibre bands, in particular the molten regions, are brought in contact with each other and compressed between the consolidation units. Subsequently, solidification is then effected in order to form the laminate by cooling the plastic material matrix.

The thermal treatment of the fibre bands in the pretreatment station can preferably be effected by means of hot air, hot gas, in particular nitrogen, ultrasound, friction, flame treatment, laser and/or irradiation. Infrared irradiation is hereby preferred since substantial method advantageous are associated herewith. Thus, infrared radiators have very short reaction times, as a result of which the energy can be introduced in a metered fashion and energy is saved. Furthermore, infrared radiators are compact heat units in comparison with heating ovens. A further advantage of the infrared radiators resides in the fact that large areas can be heated homogeneously. Thermal pretreatment via hot air or hot gas is particularly preferred.

The solidification of the molten fibre bands is effected by cooling. For example fluids, such as a water bath, water mist, air or other gases can be used for this purpose. Also achieving the solidification by thermal equalisation can be considered, only one region of the outer layer is thereby heated and the thermal equalisation with the still cold inner layer ensures solidification. A further preferred variant provides solidification by contact cooling.

In the variant according to the invention of joining by gluing, application of an adhesive, at least in regions, is preferably effected in the pretreatment station in the case of at least one fibre band. In the joining station, the fibre bands are then brought in contact, in particular the regions which have the adhesive. Subsequently, solidification is then effected to form the preform by drying the adhesive. Preferred adhesives are epoxides, silane-based adhesives, polyurethanes, methacrylic acid esters and melting adhesives.

A preferred embodiment of the method provides that the fibre bands are guided between the transport rollers and the pretreatment station by at least one guide roller. Instead of a guide roller, also static elements can be used here, for example guide webs, in order to enable guidance of the fibre bands.

Furthermore, it is preferred that, after solidification of the laminate, the latter can be separated into partial pieces. This can be effected in particular by cutting, laser treatment, squeezing, sawing, water jets, bending or combinations of these measures. The length of these partial pieces can be in general in a range from 0.1 cm to 5 m. The length of the partial pieces is thereby based on the use of the laminate, preferred ranges are from 1 m to 5 m, from 50 cm to 1 m, from 15 cm to 50 cm and from 0.1 cm to 15 cm.

If consolidation rollers are used as consolidation unit, it is preferred furthermore that these are operated at a different circumferential speed. It is hereby preferred that the absolute value of the circumferential speeds differs by no more than 100%. A different radius of the rollers is thereby likewise possible. As a result of the different circumferential speed of the consolidation rollers, shear deformation can be introduced into the laminate.

The clamping force of the consolidation rollers can be adjusted variably during the method according to the invention. This is effected preferably for example via a pneumatic cylinder, a hydraulic cylinder, springs, spindles or linear motors. The depth of the embossing can be controlled therewith and can be adjusted specifically to the material.

It is preferred that the embossing depth does not exceed ¹/₁₀ of the thickness of an individual band. Undulations in the fibres in the upper layer are thus avoided and the mechanical properties of the laminate are not impaired by the embossing process.

A further preferred embodiment provides that the consolidation units have a surface structuring, in particular in the form of grooves, intersecting notches, knurled structures or combinations hereof. Likewise, it is preferred that the consolidation units have a coating, in particular made of rubber, hard rubber or materials, for improving the separation properties, in particular Teflon. As a result of these measures, an embossed pattern can be produced on the outsides of the fibre bands, as a result of which a substantially improved composite adhesion can be ensured.

The level of filling of the fibre bands with fibres is preferably 1 to 60 percent by volume, particularly preferred 5 to 50 percent by volume and particularly preferred 10 to 40 percent by volume.

The plastic material matrix of the fibre bands is preferably a thermoplastic plastic material matrix selected from the group consisting of acetal resins, liquid-crystalline polymers, polyacrylates, polymethacrylates, olefinic and cycloolefinic polymers, polyamides, polyamide elastomers, in particular polyester amides, polyether amides and polyether ester amides, polyamide imides, polyaryl ethers including polyphenyl ethers, polycarbonates, polysulphones, polyether imides, polyimides, polyesters, polyester polycarbonates, polyethers, polyoxyethylenes, polystyrene, polysulphones, vinyl polymers, such as polyvinyl chloride and polyvinyl acetate, or mixtures of one or more of the listed materials, in particular ABS, MBS, SAN, PC and PMMA.

In the case where joining of the fibre bands is effected by gluing, solvent joining, clamping or sewing, it is also possible that the plastic material matrix is a duroplastic plastic material matrix which is selected from the group consisting of melamine resins, phenoplastics, polyester resins, aminoplastics, epoxy resins, polyurethanes, crosslinked polyacrylates and/or mixtures or blends thereof.

The thermoplastics according to the invention preferably have melting points from 50 to 500° C., preferably from 170 to 350° C. and particularly preferred from 170 to 280° C.

As thermoplastic plastic material matrix, preferably a matrix made of polyamide is used. The polyamides are thereby preferably obtained from aliphatic including cycloaliphatic diamines and aromatic or aliphatic dicarboxylic acids or from lactams. Homo- and copolyamides are formed for particular preference from cycloaliphatic C6-C17 diamines and/or aliphatic C4-C12 diamines with aliphatic C4-C20 dicarboxylic acids and/or aromatic dicarboxylic acids.

Special non-limiting examples of the dicarboxylic acids are succinic acid, glutaric acid, adipic acid, pimelic acid, suberic acid, azelaic acid, sebacic acid, undecanedioc acid, dodecanedioic acid, brassylic acid, tetradecanedioc acid, pentadecanedioic acid, hexadecanedioic acid, heptadecanedioc acid, octadecanedioc acid, nonadecanedoic acid, 1,4-cyclohexanedicarboxylic acid, eicosandioic acid, naphthalene dicarboxylic acid, terephthalic acid and isophthalic acid.

Alternatively, also polyamides which are formed from the above-mentioned diamines and dicarboxylic acids and also lactams with 4 to 15 C atoms and/or, ω-amino acids with 4 to 15 C atoms are preferred.

Special non-limiting examples of the diamines are hexamethylene diamine, heptamethylene diamine, octamethylene diamine, nonamethylene diamine, decamethylene diamine, undecanemethylene diamine, dodecamethylene diamine, trimethylhexamethylene diamine, 2-methyl-1,5-pentane diamine, isophorone diamine, norbornane diamine, 1,3-bis(aminomethyl)cyclohexane, MACM, MXD, PACM, PXD and TMACM.

MACM stands for 3,3'-dimethyl-4,4'-diaminocyclohexylmethane, MXD stands for meta-xylylene diamine, PACM stands for 4, 4'-diaminocyclohexylmethane, PXD stands for para-xylylenediamine and TMACM stands for 3,3',5,5'-tetramethyl-4,4'-diaminocyclohexylmethane.

Further preferred are polyamides made of MXD and terephthalic acid, or MXD and isophthalic acid.

Preferred transparent polyamides are selected from the group: MACM9-18, PACM9-18, MACMI/12, MACMI/MACMT, MACMI/MACMT/12, 6I6T/MACMI/MACMT/12, 3-6T, 6I6T, TMDT, 6I/MACMI/MACMT, 6I/PACMI/PACMT, 6I/6TMACMI, MACMI/MACM36, 6I, 12/PACMI, MXDI/6I or 12/MACMT, 6/PACMT, 6/6I, 6/IPDT or mixtures thereof, 50% by mol of the IPS being able to be replaced by TPS.

Further preferred are partially crystalline polyamides selected from the group consisting of PA6, PA66, PA69, PA610, PA612, PA11, PA12, PA1010, PA1012, PA1210, PA1212. Particularly preferred are PA12 and mixtures of PA66 and PA6I6T.

Preferably, the fibres are endless fibres or staple fibres with supercritical fibre length, in particular carbon-, glass-, mineral- or aramide fibres. Particularly preferred here are carbon- and glass fibres with a flat or round cross-section, carbon fibres are particularly preferred. Also mixtures of the mentioned fibres can be used.

The fibre bands can preferably have further additives. These are selected preferably from the group consisting of inorganic stabilisers, organic stabilisers, lubricants, defoamers, chain-lengthening additives, optical brighteners, plasticisers, adhesion promoters, halogen-containing flame retardants, halogen-free flame retardants, impact modifiers, particles, fillers and reinforcers, colourants, pigments and/or mixtures thereof.

A further preferred embodiment provides that each individual fibre band is supplied via at least one separate transport roller, the respective transport rollers being actuatable separately for the individual fibre bands. This makes it possible for the individual fibre bands to be guided at different speeds to the joining station. The speeds can hereby be up to 100 m/min, for preference, the speed should be maintained between 6 cm/min and 100 m/min. At lower speeds, the economic efficiency of the method is too low, whereas higher speeds lead, for the variant "melting of the thermoplastic plastic material matrix" to an inadequate heat introduction.

A further preferred embodiment provides that the fibre bands used have the same plastic material matrix, fibre reinforcement and additivation. It is however also possible to use fibre bands which differ with respect to their composition.

According to the invention, a laminate which is producible according to the previously described method is likewise provided.

By suitable process guidance, in particular the use of shaping rollers and/or using consolidation rollers with different circumferential speeds, the laminates according to the invention have a shape memory. This hereby concerns preferably circular, S-shaped or meandering structures.

There should be understood here by shape memory of the laminates or of the plastic material matrix that the laminate or plastic material can "remember", after a subsequent reshaping, its earlier outer shape introduced by the shaping rollers and in this respect has a shape memory. In order to retrieve the earlier shape, the laminate can be subjected to stimulation. This can be effected for example by heat supply, irradiation or another change in the chemical environment.

The preferred dimensions of the laminates according to the invention have preferably a length of 0.1 cm to 5 m. The width is preferably 5 to 40 mm, preferably 5 to 20 mm, particularly preferred 5 to 12 mm. The thickness of the laminates is preferably 0.3 to 1.5 mm, preferably 0.4 to 1.2 mm and particularly preferred 0.5 to 1.0 mm.

The laminates according to the invention are used for local reinforcing of injection moulded parts. There are included herein in particular:

pressure containers, preferably water meters or pump housings;
automobile parts, preferably running gear components, struts, interior parts, exterior parts, transmission components and wheel rims;
industrial and consumer goods, preferably levers, fixings, garden implements, tools, household appliances, sanitary components, racquets, bows and shoes.

It is thereby preferred to injection-mold of a polymer which is the same as the polymer which was used for the fibre band around the laminate. Furthermore, it is preferred to use a polymer for the injection molding around the laminate which has a similar or higher melting point than the polymer which was used for the fibre band.

Likewise, it is possible that the laminates themselves are used as leaf springs.

Furthermore, the present invention relates to fibre bands with embossing, methods for production thereof and use of the fibre bands for reinforcing injection moulded parts. As in the case of the above-described laminates, a substantially improved composite adhesion to the injection moulded part is ensured also for the fibre bands due to the embossing.

There are possible as starting materials for fibre bands with embossing, all the above-mentioned plastic-, reinforcing materials and additives. The above-indicated preferred embodiments with respect to the starting materials of the fibre bands for the production of laminates also apply to the fibre bands with embossing.

The thickness of the fibre bands is preferably from 0.1 to 1.5 mm, preferably from 0.2 to 1.0 mm and particularly preferred from 0.2 to 0.5 mm. The width of the fibre bands is preferably from 1 to 40 mm, preferably from 2 to 20 mm and particularly preferred from 5 to 12 mm.

The embossing step can be integrated in principle in any of the known production methods for fibre bands, but can also be implemented separately. Production methods for fibres bands are described for example in EP 0 579 047 A1 and DE 43 25 260 A1. For reasons of economic efficiency, it is preferred to integrate the embossing step in a pultrusion method for the production of fibre bands.

The embossing is effected in particular by stamps, rollers or chain segments which have a surface structuring. The surface structuring is configured in particular in the form of grooves, intersecting notches, knurled structures or combinations hereof.

The fibre bands can be embossed on the upper- and underside or also only on one of the two sides. In addition, the embossing can extend over the entire surface or be restricted to parts of the surface.

It is preferred that the embossing depth does not exceed 1/6 of the fibre band thickness. Thus, undulations of the fibres in the upper layer are avoided and the mechanical properties of the fibre band are not impaired by the embossing process.

The fibre bands with embossing according to the invention are used in local reinforcement of injection moulded parts. The uses listed already for the laminates are particularly preferred.

It is thereby preferred to injection-mold a polymer which is the same as the polymer which was used for the fibre band around the fibre band. Furthermore, it is preferred to use a polymer for the injection molding around the fibre band which has a similar or higher melting point than the polymer which was used for the fibre band.

The method according to the invention is intended to be described in more detail with reference to the subsequent Figures without wishing to restrict said method to the specific embodiments shown here.

DETAILED DESCRIPTION OF THE DRAWINGS

Figure 1:
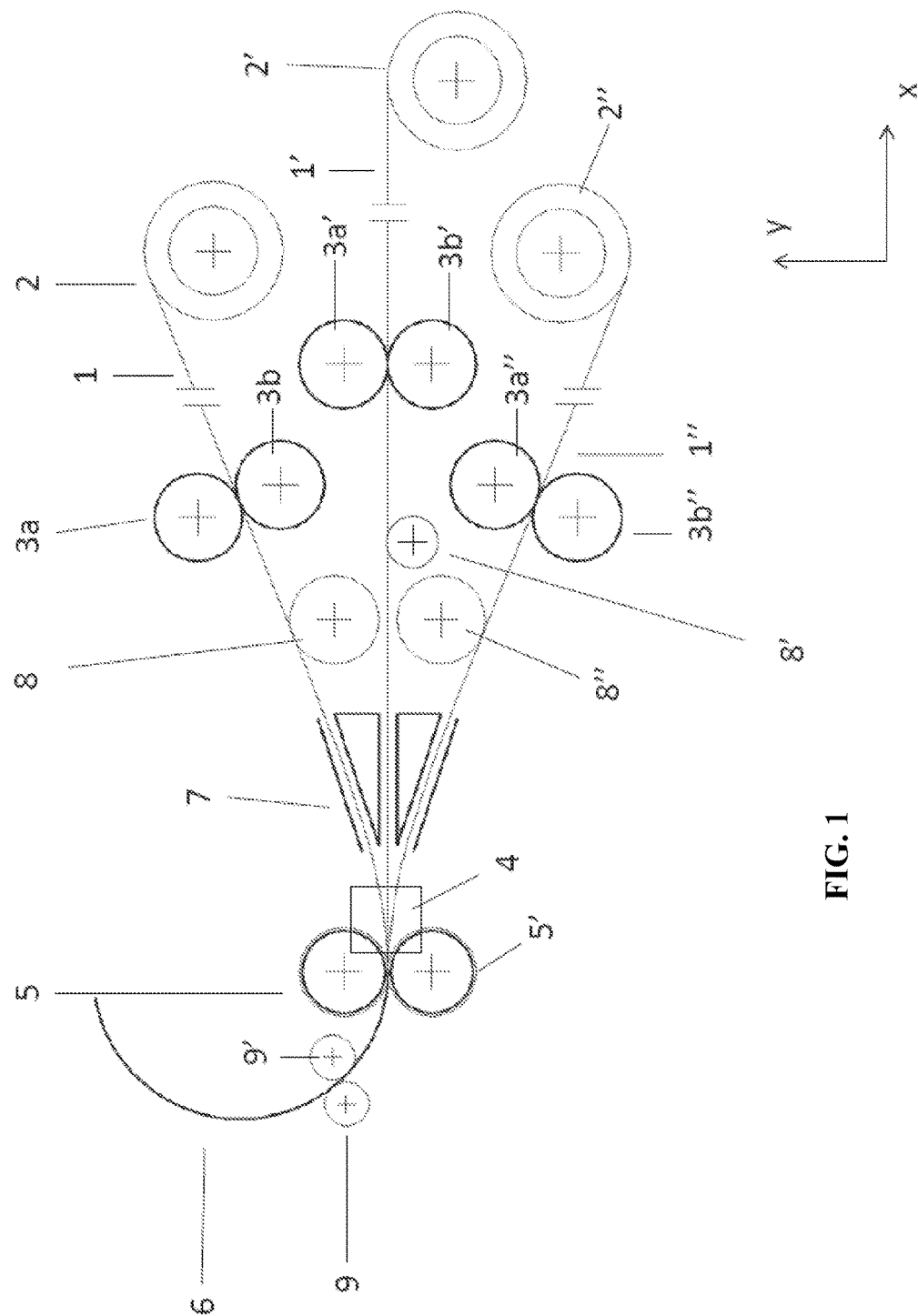
FIG. 1 shows a variant of the method according to the invention with reference to a schematic illustration.

The method according to the present invention can be implemented in principle according to the illustration in FIG. 1. The fibre bands (1, 1', 1") are guided from a material store (2, 2', 2") via the transport rollers (3a, 3b, 3a', 3b', 3c, 3c'), which are disposed in pairs, to a pretreatment station (7), optionally a guide roller (8, 8', 8") can be used to assist transport of the fibre bands (1, 1', 1"). In the pretreatment station (7), the fibre bands (1, 1', 1") are optionally prepared for the step of joining, e.g. in the case of fibre bands with a thermoplastic matrix, the preparation is effected by heating and at least partial melting of the thermoplastic matrix. Further transport of the fibre bands (1, 1', 1") from the pretreatment station (7) to the joining station (4) is effected continuously. In the joining station (4), joining of the fibre bands (1, 1', 1") to form the laminate (6) is effected by consolidation rollers (5, 5'). After consolidation of the fibre bands (1, 1', 1"), solidification is effected to form the laminate (6). Optionally, the laminate (6) is guided through shaping rollers (9, 9') which are disposed behind the consolidation unit.

Figure 2:
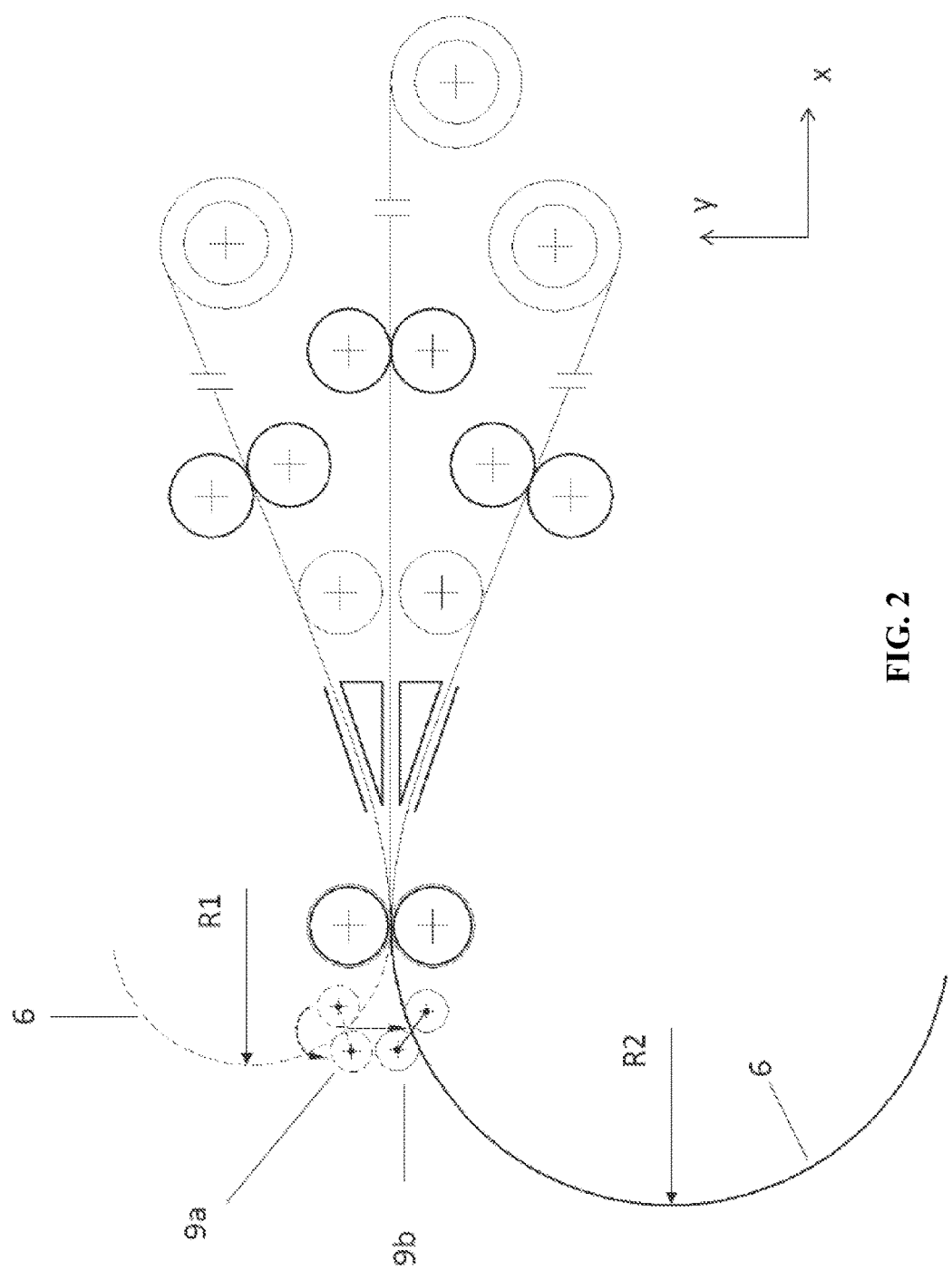
FIG. 2 shows a further variant of the method according to the invention with reference to a schematic illustration.

According to the schematic illustration in FIG. 2, the curvature and curvature direction of the laminate (6) can be manipulated by pivoting and displacing the shaping rollers (9, 9'). The orientation of the shaping rollers (9, 9') in position 9a thus leads to a laminate (6) with the radius R1 whereas the orientation of the shaping rollers (9, 9') in position 9b leads to a laminate (6) with the radius R2. Since the orientation of the shaping rollers (9, 9') during the production process of the laminate (6) can be changed at any time, almost any imaginable shape can be given to the laminate (6).

Figure 3:
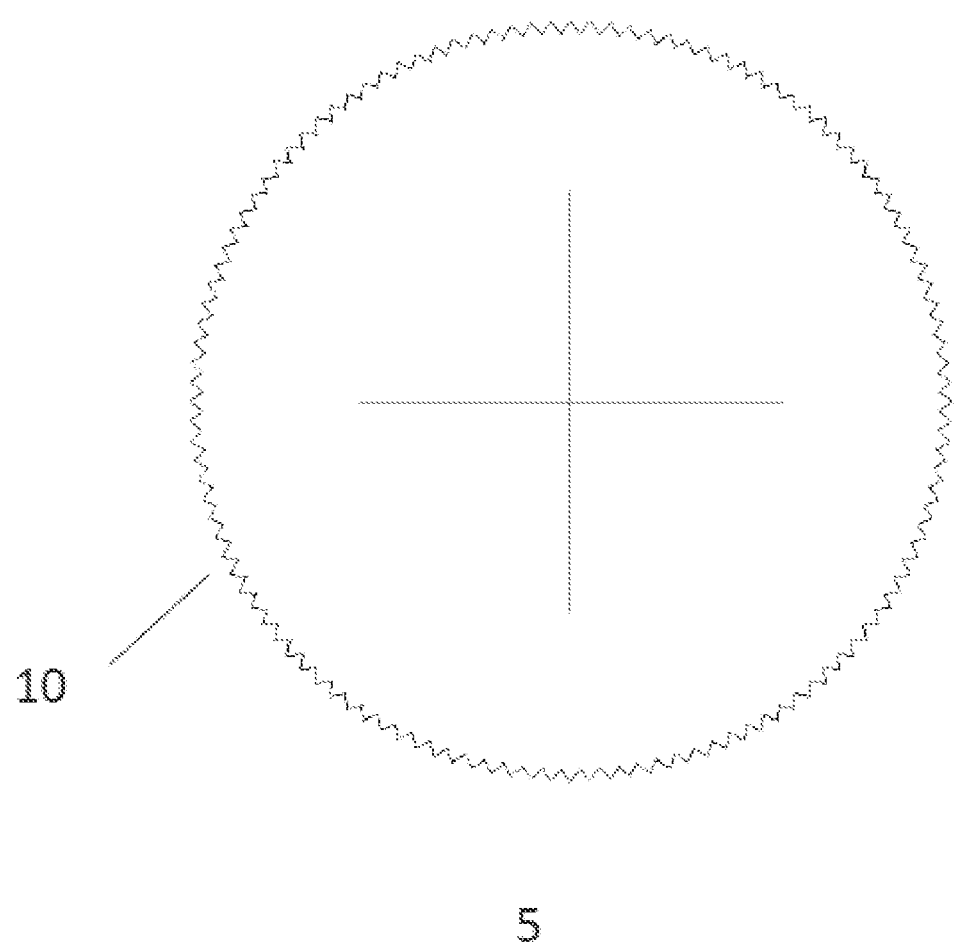
FIG. 3 shows a variant of a surface structuring of the consolidation rollers according to the invention.

The consolidation rollers (5, 5'), as shown in FIG. 3, can have a surface structure (10) which allows embossing of the fibre bands or laminates.

The invention claimed is:

1. A method for the continuous production of a shaped laminate having an S-shaped geometry, a meandered geometry, or a circular geometry, wherein the shaped laminate is made from a laminate made of at least two fibre bands made of fibres which are embedded unidirectionally in a plastic material matrix, having the following steps:
    a) transporting the fibre bands made of fibres which are embedded unidirectionally in a plastic material matrix produced by a pultrusion method, from respectively one material store by at least one transport roller to a joining station,
    b) layering the fibre bands between at least two consolidation units present in the joining station,
    c) joining the fibre bands by means of the two consolidation units to form a continuous laminate, and
    d) solidifying the continuous laminate obtained in step c), wherein before or during step d), shaping the continuous laminate into an S-shaped geometry, a meandered geometry, or a circular geometry to obtain the shaped laminate,
    wherein the shaping of the continuous laminate is effected by translatory and rotary displacement, and by means of at least two shaping units, the shaping units being positioned behind the consolidation units, such that the geometry of the continuous laminate is produced during solidification of the continuous laminate due to the stressing of the continuous laminate.

2. The method according to claim 1, wherein the consolidation units are consolidation rollers, said consolidation rollers operating at a different circumferential speed.

3. The method according to claim 1, wherein the fibre bands are prepared in a pretreatment station which is disposed between the transport rollers and the joining station, for the joining process.

4. The method according to claim 3, wherein, in the pretreatment station, a thermal treatment of the fibre bands is effected for the melting, at least in regions, of the plastic material matrix, joining is effected, in the joining station, by bringing in contact the molten regions of the fibre bands and by compression between the consolidation units, and the solidification is accompanied by cooling of the continuous laminate.

5. The method according to claim 3, wherein, in the pretreatment station, an adhesive is applied on at least one fibre band, at least in regions, and joining is effected, in the joining station, by bringing in contact the regions of the fibre bands which have the adhesive, and solidifying the fibre bands by drying the adhesive.

6. The method according to claim 3, wherein the fibre bands are guided between the transport rollers and the pretreatment station by at least one guide unit.

7. The method according to claim 1, wherein, after step d), separation of the continuous laminate into partial pieces is effected.

8. The method according to claim 1, wherein the plastic material matrix is a thermoplastic plastic material matrix selected from the group consisting of acetal resins, liquid-crystalline polymers, polyacrylates, polymethacrylates, olefinic polymers, cycloolefinic polymers, polyamides, polyamide elastomers, polyester amides, polyether amides, polyether ester amides, polyamide imides, polyaryl ethers, polyphenyl ethers, polycarbonates, polysulphones, polyether imides, polyimides, polyesters, polyester polycarbonates, polyethers, polyoxyethylenes, polystyrene, polysulphones, vinyl polymers, polyvinyl chloride, polyvinyl acetate and mixtures of one or more of the listed materials.

9. The method according to claim 4, wherein the plastic material matrix is a duroplastic plastic material matrix selected from the group consisting of melamine resins, phenoplastics, polyester resins, aminoplastics, epoxy resins, polyurethanes, crosslinked polyacrylates and mixtures and blends thereof.

10. The method according to claim 1, wherein the fibres are endless fibres or staple fibres with supercritical fibre length with a flat or round cross-section.

11. The method according to claim 1, wherein the fibre bands comprise one or more additives selected from the group consisting of inorganic stabilisers, organic stabilisers, lubricants, defoamers, chain-lengthening additives, optical brighteners, plasticisers, adhesion promoters, halogen-containing flame retardants, halogen-free flame retardants, impact modifiers, particles, fillers, reinforcers, colourants, pigments and mixtures thereof.

12. The method according to claim 1, wherein each fibre band is supplied via at least one separate transport roller, the at least one transport roller being able to be actuated respectively separately.

13. The method according to claim 1, wherein the consolidation units have a surface structuring and/or a coating for improving the separation properties or for producing an embossed pattern on the outsides of the fibre bands.

* * * * *